United States Patent [19]
Stasiuk

[11] 3,782,224
[45] Jan. 1, 1974

[54] POWER TRANSMISSION DEVICE
[75] Inventor: Michael Stasiuk, Winnipeg, Manitoba, Canada
[73] Assignee: Versatile Manufacturing, Ltd., Winnipeg, Manitoba, Canada
[22] Filed: Apr. 5, 1972
[21] Appl. No.: 241,248

[30] Foreign Application Priority Data
Apr. 6, 1971 Great Britain................ 8,834/71

[52] U.S. Cl..................... 74/687, 74/15.63, 74/740
[51] Int. Cl. ....................... F16h 47/04, F16h 37/00
[58] Field of Search.................. 74/740, 687, 720.5, 74/11, 15.63

[56] References Cited
UNITED STATES PATENTS
| | | | |
|---|---|---|---|
| 3,122,025 | 2/1964 | Mark et al. | 74/687 X |
| 3,306,129 | 2/1967 | Delalio | 74/687 |
| 3,488,947 | 1/1970 | Miller et al. | 74/687 X |
| 3,503,281 | 3/1970 | Gsching et al. | 74/687 X |
| 3,665,787 | 5/1972 | Wilkinson | 74/674 |

Primary Examiner—Arthur T. McKeon
Attorney—Stanley G. Ade

[57] ABSTRACT

A power transmission device for mobile units such as tractors or the like is driven by a source of power such as a diesel engine and includes at least three modes of power transmission which can be selected by the operator. It includes a planetary train, a constant mesh gear box, an hydrostatic pump and an hydrostatic motor driven by said pump. The hydromechanical mode transmits power via the pump and motor through the planetary gear train to the constant mesh gear box and hence to the output shaft. The basic mechanical mode transmits power via the planetary train directly to the constant mesh gear box. The hydrostatic mode transmits power from the hydrostatic motor to the constant mesh gear box. A power takeoff can be operatively connected to these three modes and means are provided to shift the power takeoff connecting means to a portion of the planetary gear train casing so that a further mechanical road gear or mode is provided which has a higher speed range than the basic mechanical mode.

12 Claims, 3 Drawing Figures 3,782,224

POWER TRANSMISSION DEVICE

BACKGROUND OF THE INVENTION

This invention relates to new and useful improvements in power transmission devices particularly suitable for use with heavy duty tractors and the like. Such tractors are normally used under several conditions and it is extremely difficult to provide a single transmission which will satisfy the power and output requirements for all conditions. As an example, a heavy duty farm tractor or the like is required to operate under heavy duty drawbar load conditions in the field, under highly variable speed conditions for medium loads and on high variable speed conditions for heavy loads. It is also desirable obviously to have a relatively high gear which will permit the tractor to be moved at higher speeds from place to the other along roads or the like. To satisfy heavy load conditions conventional tractors have a relatively low gear provided and it therefore takes considerable time to move the tractor from one point to the other under conditions of light load.

SUMMARY OF THE INVENTION

The present invention overcomes all of these disadvantages by providing a multiple load transmission which, in conjunction with a source of power, a hydrostatic variable pump, a hydrostatic motor and a planetary gear train, permits a selection of modes to be provided.

The principal object and essence of the invention is therefore to provide a device of the character herewithin described in which a variety of modes can be selected as follows.

1. Hydro-mechanical mode which is a combination of mechanical transmission and hydrostatic power and gives an infinitely variable speed selection within the limits of the design. This particular mode is designed specifically for use under relatively heavy loads which require variations in speed relatively continuously.

2. Fully mechanical in which the drive is through a planetary gear system to a constant mesh gear box, the constant mesh gear box having a low and high range. This is used for heavy duty drawbar loads particularly in the field.

3. Fully hydrostatic in which the power in the engine is transmitted to a hydrostatic pump which in turn is operatively connected to a hydrostatic motor and then directly connected to the constant mesh gear box. This gives infinitely variable speeds forward and reverse within the design characteristics of the device and is used not only for reverse conditions but for conditions similar to those of the hydro-mechanical mode but under somewhat lighter loads.

A power takeoff is provided which may be connected or disconnected to the main drive shaft as desired with the exception of one specific condition under which circumstances the power takeoff drive connector may be locked integrally with the planetary gear system thus giving a direct drive from the drive shaft to the constant mesh gear box. This gives relatively higher speeds under light loads and is known as a "fully mechanical road gear mode".

Various selectors are provided so that any of the modes may be selected and a control lever is provided for the hydrostatic variable pump so that the speed and direction of this pump may be controlled as desired.

The driven shaft of the constant mesh gear box is connectable by conventional means to either two or four wheel drive mechanisms of a tractor or the like and the source of power, normally a diesel engine, is designed to run at a relatively constant speed thus giving maximum torque delivery for the particular engine selected.

The device is relatively compact, simple in construction, economical in manufacture, and otherwise well suited to the purpose for which it is designed.

With the foregoing objects in view, and such other or further purposes, advantages or novel features as may become apparent from consideration of this disclosure and specification, the present invention consists of the inventive concept which is comprised, embodied, embraced, or included in the means, method process, product, construction, composition, arrangement of parts, or new use of any of the foregoing, herein exemplified in one or more specific embodiments of such concept, reference being had to the accompanying drawings in which:

BRIEF DESCRIPTION OF THE DRAWINGS

FIG. 1$a$ is a continuation of FIG. 1 and is also a longitudinal section of the transmission showing some parts schematically.

In the drawings like characters of reference indicate corresponding parts in the different figures.

PRELIMINARY DESCRIPTION

Figure 1:
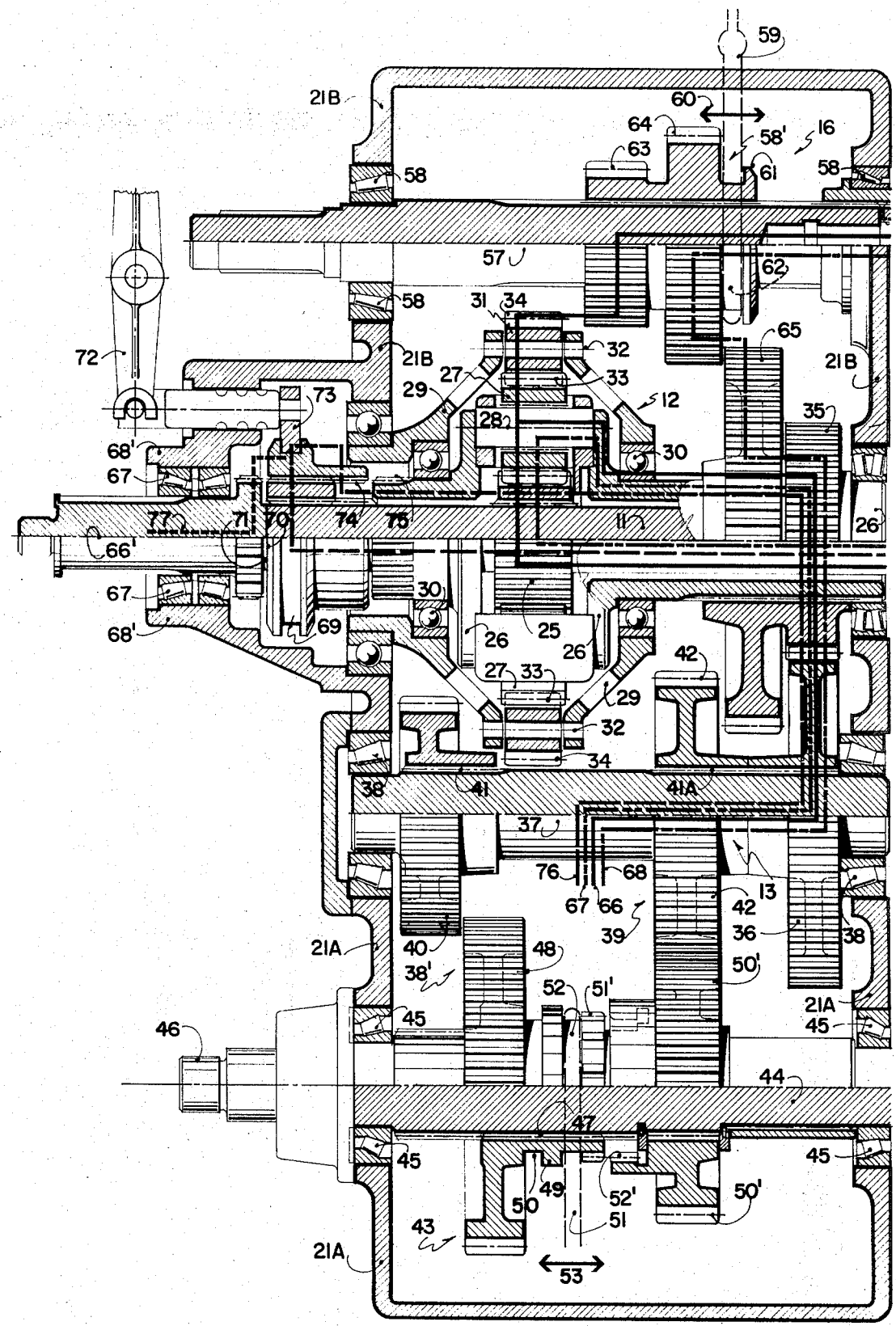
FIG. 1 is a longitudinal section of the transmission with some components such as the pump motor, clutch and source of power being shown schematically.
Figure 1A:
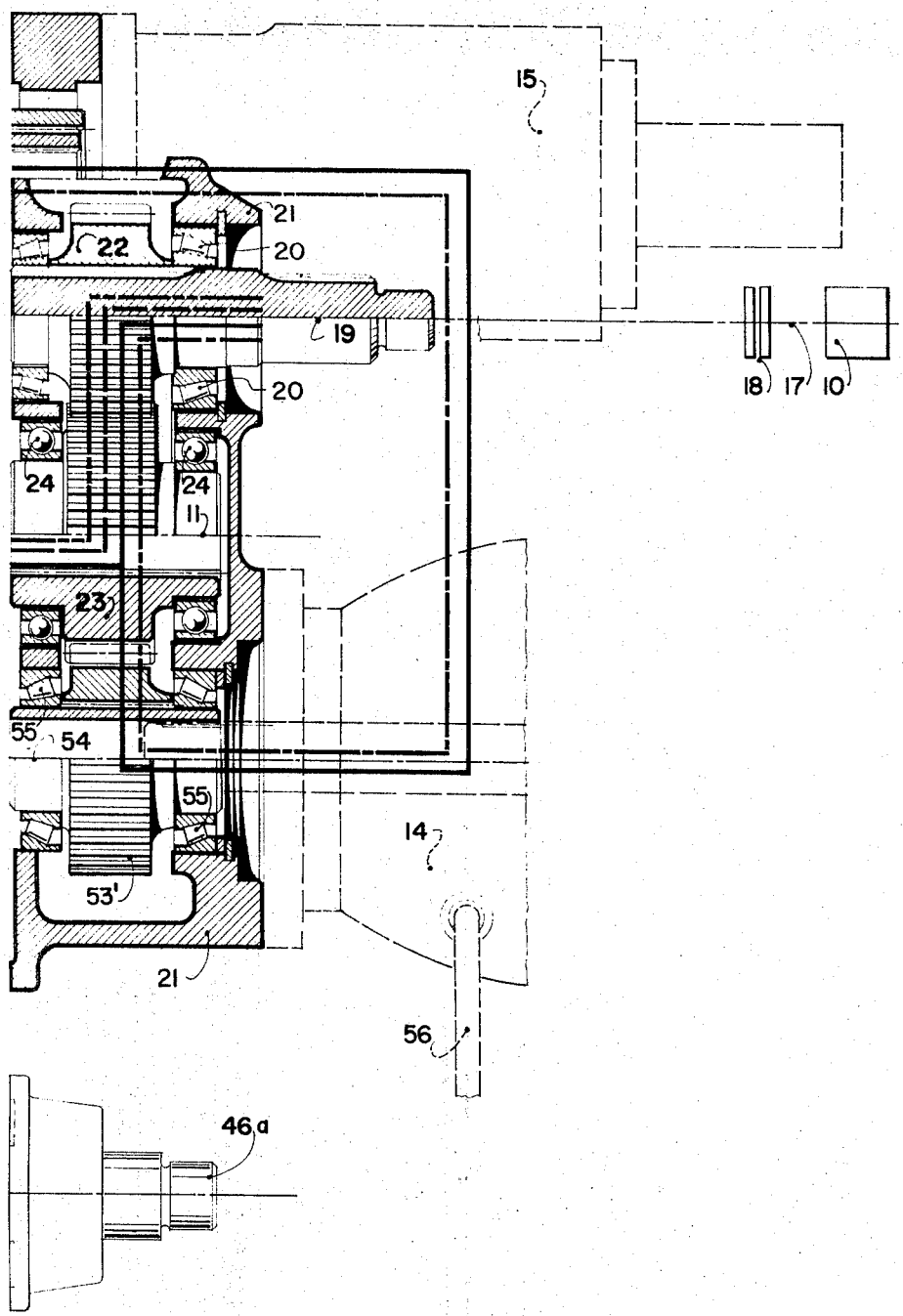
Figure 2:
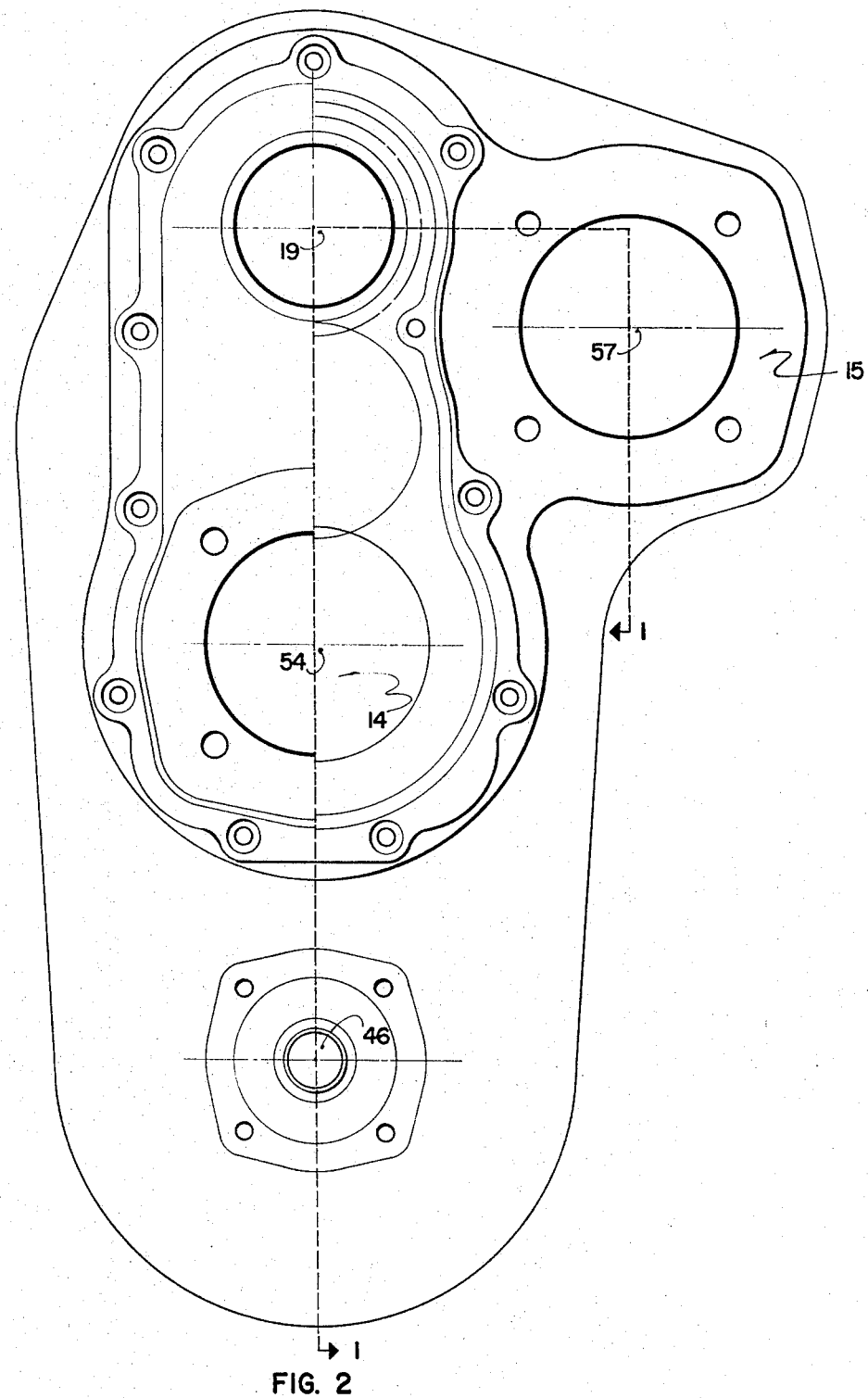
FIG. 2 is an end view of the exterior casing of the transmission.

The invention is designed to be used primarily in heavy duty tractors (not illustrated) although, of course, it will be appreciated that the transmission can be adapted for use with other mobile units.

It consists of a source of power shown schematically by reference character 10, connected to a main drive shaft 11 and having a planetary gear assembly collectively designated 12 connected to the drive shaft.

A constant mesh gear box collectively designated 13 is connected to the planetary gear system and a hydrostatic variable pump collectively designated 14 is also driven by the source of power. This pump is selectively connectable to a hydrostatic motor 15 which in turn drives an assembly collectively designated 16 which enables the hydrostatic motor to be connected either to the planetary gear system 12, or the constant mesh gear box 13 or to remain in a neutral position.

DETAILED DESCRIPTION

In detail, the engine 10 is connected via a shaft shown schematically at 17 to a clutch shown schematically at 18 and controllable in the usual way.

This clutch connects the source of power 10 to an input shaft 19 supported within bearings 20 held within a main casing 21.

A gear 22 is secured to this input shaft for rotation therewith and is constantly engaged with a further gear 23 secured to one end of the main drive shaft 11.

This main drive shaft is supported within bearings 24 in the casing at one end thereof and by further bearings at the other end which will hereinafter be described.

The planetary gear assembly 12 includes a sun gear 25 secured or keyed to the drive shaft 11 and rotatable thereby. A first planetary cage 26 surrounds the drive shaft 11 and carries a plurality of planetary gears 27 upon spindles 28 situated around the periphery of the cage in the conventional manner.

A second planetary gear cage 29 is journalled around the first gear cage 26 by means of bearings 30 and this second planetary gear cage carries a combination inner and outer ring gear collectively designated 31 which is bolted between the peripheries of the two halves of the second planetary gear cage 29 by means of bolts 32. This combination ring gear 31 includes an inner ring gear 33 and an outer ring gear 34 and the aforementioned planetary gears 27 permanently engage with the inner ring gear 33 in the usual manner.

A connecting gear 35 is secured to one end of the first cage 26 where it extends around the main shaft 11 and this connecting gear is permanently engaged with a constant mesh drive gear 36 situated within the constant mesh portion 13 of the transmission. This constant mesh transmission includes a lay shaft 37 supported within bearings 38 carried by the casing 21A and extends parallel but spaced from the main drive shaft 11.

A plurality of gear ratios are provided within the constant mesh gear box 13 and in this particular embodiment, a low gear section 38' is provided together with a high gear section 39. The low gear section includes the drive gear 40 secured to the lay shaft 37 by means of splines 41 and the high gear section includes a high drive gear 42 also splined to the lay shaft 37 by splines 41A.

An end shiftable combination gear collectively designated 43 is mounted upon a main transverse driven shaft 44 which in turn is journalled within bearings 45 within the casing portion 21A. This driven shaft 44 extends externally of the casing and is provided with yokes 46 upon either end one of which is driveably connected to the front axle (not illustrated) and the other of which is operatively connected to the rear axle of the tractor or mobile unit (not illustrated). As such connections are conventional, it is not deemed necessary to describe same further.

The combination gear 43 is mounted upon splines 47 formed on the driven shaft 44 and may be end shifted. This combination gear includes a low gear portion 48 and a high gear portion 49. A collar 50 is provided between the two gear portions and a yoke shown schematically by the reference character 51 engages a groove 52 in the collar and may be moved in the direction of double headed arrow 53 thus end shifting the component 43 along the driven shaft 44 so that gear 48 engages gear 40, when the gear box is in the low gear position. It will be observed that a further gear 50' is freely mounted for rotation upon the driven shaft 44 and is permanently engaged with the aforementioned high drive gear 42. Once side of the collar 50 is provided with a dog clutch portion 51' which, when the component 43 is moved in the opposite direction along the driven shaft 44, engages a corresponding dog shaft portion 52' formed on one side of the gear 50' thus engaging the gear box in the high gear position. In FIG. 1, the component 43 is shown in the neutral position.

It will of course be appreciated that similar constant mesh gearing could be provided for the low side but as this gear is normally engaged when the motive driver is stationary, it is more economical to provide the type of gearing described and illustrated. The high gear is constant mesh and as also is the connecting and constant mesh drive gear portion.

Referring back to the gear 23 secured to one end of the main shaft 11, it will be noticed that there is a further gear 53' mounted upon a shaft 54 and journalled within bearings 55 within one end of the casing 21.

The shaft 54 extends beyond the casing and is connected to a variable hydrostatic pump 14 which is conventional in construction and is shown in partially schematic form in FIG. 1. This includes a control lever 56 which controls the conventional swash plate therewithin thus controlling the volume of fluid pumped thereby together with the direction this fluid is routed.

The fluid is routed via lines (not illustrated) to the aforementioned hydrostatic motor 15 secured also to one end of the casing 21 substantially above the input shaft 19.

This hydrostatic motor drives the hydrostatic drive shaft 57 and as the hydrostatic motor is also conventional in construction it is shown partially schematically and details are not believed necessary.

The hydrostatic drive shaft 57 is journalled for rotation within bearings 58 in one portion of the casing 21B and an end shiftable gear component 58' is splined to the hydrostatic drive shaft 57 and is end shiftable therealong by means of a lever 59 shown schematically thus enabling the gear component 58' to be moved in either direction from the neutral position illustrated, said either direction being indicated by reference character 60.

The component 58' includes a grooved collar 61 engageable by a conventional end shifting fork shown schematically by 62 connected to the control lever 59.

It includes a first gear 63 and a second gear 64.

When end shifted to the left with respect to FIG. 1, the first gear 63 engages within the outer ring gear 34 of the planetary gear assembly 12 and when end shifted to the right with respect to FIG. 1, the second gear 64 engages with an hydrostatic drive gear 65 secured to the extension of the first planetary cage 26 in a manner similar to the connecting gear 35 and rotatable with this cage 26.

The routing of the power from the engine 10 is shown for the three principal modes as follows.

The solid line 66 shows the routing of the power for the device when in the hydro-mechanical mode, the dash and double dot line 67 shows the routing of the power when the device is in the basic mechanical mode, and the single dot-dash line 68 shows the routing of the power when the device is in the hydrostatic mode.

Dealing first with the basic mechanical mode, the drive is transmitted through the input shaft 19, through gears 22 and 23 to the main shaft and thence to the sun gear 25 of the planetary gear assembly 12. It should be understood that when in this mode, the gear 63 of component 58' is in engagement with the outer ring gear 34 and thus the hydrostatic motor acts as a brake and prevents the ring gear from rotating.

The sun gear rotates the first planetary cage 26 and this in turn rotates the connecting gear 35 together with the constant mesh drive gear 36.

Depending upon whether low or high gears are required within the constant mesh gear box as hereinbefore described, the driven shaft 44 will be driven in low gear or high gear.

When in the hydro-mechanical mode, component 58' is again end shifted to the left so that gear portion 63 engages the outer ring gear 34 of the planetary gear assembly 12. Under these circumstances, the power is transmitted through the main shaft 11 to the planetary gears 27 and cage 26 but the characteristics of the movement of this cage 26 is controlled by the hydrostatic pump lever 56.

Operation of this lever causes the hydrostatic motor 15 to move forwardly or rearwardly at an infinite speed depending upon the design characteristics thus rotating the ring gear 34 together with the second cage 29 in either direction and at varying speeds. This modifies the speed and characteristics of the output from the planetary gear assembly 12 which, of course, modifies the rotation direction and speed characteristics of the connecting gear 35. Once again the constant mesh gear box may either be engaged in low or high gear as desired.

Dealing next with the purely hydrostatic mode, the component 58' is end shifted to the right so that gear portion 64 engages the hydrostatic drive gear 65.

Under these conditions the constant mesh drive gear 36 is driven and influenced solely by the hydrostatic motor which in turn is controlled both as to speed and direction by the hydrostatic variable pump lever 56.

A power takeoff shaft 66' is journalled within bearings 67' carried within an outward extension 68' of the casing, said power takeoff shaft being axially aligned with the main drive shaft 11 as clearly shown.

An end shiftable dog clutch collar assembly 69 is splined to the end of the drive shaft 11 and includes a dog clutch face 70 on one side thereof corresponding to a similar dog clutch face 71 formed on the inner end of the power takeoff shaft 66'. A lever assembly 72 operates a conventional collar yoke 73 to move the assembly 69 into and out of engagement with the power takeoff shaft 66' so that in any mode, power takeoff can be utilized if desired.

A further mode is provided in conjunction with this collar assembly 69 designed to give a higher range of speed under conditions of light load. This is particularly useful when transporting the prime mover or mobile unit from one place to another as for example, over roads or the like.

It consists of an external spline portion 74 formed on the opposite side of the collar assembly to the dog clutch portion 70, said splines being engageable with corresponding splines 75 formed in one end of the secondary cage 29 where it surrounds the first cage 26.

The lever 72 is adapted to engage the splines 74 and 75 together thus rotating the entire planetary gear assembly as one unit or in a locked up condition thereby giving direct drive from the main shaft 11 to the constant speed gear box 13 under which circumstances, of course, either the low gear or high gear assembly may be engaged.

The path of the transmittal of power for this particular mode is shown by the dashed lines specifically designated 76 and it will be seen that it goes directly from the main shaft back through the first cage 26 and thence to the connecting gear 35 and the constant mesh drive gear 36.

The power for the power takeoff is shown in conjunction with the other modes by the dotted line designated 77.

Purely as an illustrative measure, the following ranges are available with the various modes.

Hydro-mechanical (solid line 66) with the power takeoff not live, an infinitely variable speed range is provided and as an example, with the constant mesh gear box engaged with the low gear assembly, a low range of 2.46 to 4.40 miles per hour is available. If the constant mesh gear box is engaged in the high range then the range of speed is between 4.48 and 8 miles per hour.

Fully mechanical (dash and double dotted line 67) with the power takeoff not live, and the hydraulic pump in neutral, and the ring gear locked, the low range is approximately 2.46 miles per hour and the high range is 4.48 miles per hour.

With the hydrostatic drive engaged (dot-dash line 68) and with high pressure oil routed from the pump to either side of the motor depending upon direction of rotation, in low range forward or reverse. Zero to 3.25 miles per hour and in high range 0 to 6.5 miles per hour. Under these circumstances a live power takeoff is obtainable.

Finally in the mechanical road gear mode (dashed line) a low range speed of 8.7 miles per hour is available and a high range speed of 15.8 miles per hour is available. Under these circumstances, of course, the power takeoff shaft cannot be engaged.

The above speed ranges are purely empirical and are based upon design parameters of the various gear sizes and the speed of the source of power together with the design and operation of the hydrostatic pump and hydrostatic motor.

The entire assembly is extremely rugged and is designed as before mentioned, for heavy duty drawbar loads under a variety of conditions together with the flexibility enabling same to be operated under various conditions and to be transported at relatively high speeds under light load from one place to the other.

Various modifications may be constructed or performed within the scope of the inventive concept disclosed. Therefore what has been set forth is intended to illustrate such concept and is not for the purpose of limiting protection to any herein particularly described embodiment thereof.

What I claim as my invention is:

1. A multiple mode transmission for mobile units such as tractors and the like which include a source of power; comprising in combination a casing, a main drive shaft bearably supported for rotation in said casing and being selectively connectable to said source of power, a planetary gear assembly surrounding said main shaft and being bearably supported for operation upon said main shaft and within said casing, a constant mesh gear box, an hydrostatic pump operatively connected to said source of power, an hydrostatic motor operatively connected to said hydrostatic pump, means to selectively operate said transmission in a plurality of modes including a basic mechanical mode, by operatively connecting said planetary gear assembly to said constant mesh gear box, a hydrostatic mode by operatively connecting said hydrostatic motor to said constant mesh gear box, and a hydro-mechanical mode by operatively connecting said hydrostatic motor to said constant mesh gear box via said planetary gear assembly.

2. The transmission according to claim 1 in which said planetary gear assembly includes a sun gear secured for rotation to said main shaft, a first planetary cage, journalled for rotation upon said main shaft, a plurality of planetary gears supported for rotation within said first planetary cage and engaging said sun gear, a second planetary cage supported for rotation upon said first planetary cage, an inner and an outer ring gear assembly carried by said second planetary cage, said planetary gears engaging said inner ring gear, and a connecting gear secured to said first planetary cage, a constant mesh drive gear in said constant mesh gear box, said connecting gear being permanently engaged with said drive gear.

3. The transmission according to claim 2 in which said means to operate said transmission in said basic mechanical mode includes means to hold said ring gear and said second planetary cage stationary whereby rotation of said main shaft by said source of power rotates said sun gear, said planetary gears, said first planetary cage and said connecting gear.

4. The transmission according to claim 3 in which said means to selectively operate said transmission in a hydromechanical mode includes a hydrostatic motor drive shaft journalled for rotation in said casing and being operatively connected to said hydrostatic motor, an end shiftable gear on said hydrostatic motor drive shaft, means to end shift said end shiftable gear whereby same is engaged with said outer ring gear in one position and is disengaged from said outer ring gear in another position, said hydrostatic motor, when said end shiftable gear is in said one position, controlling the speed and direction characteristics of said second planetary gear cage and hence the speed and directional characteristics of said connecting gear and said constant mesh gear box.

5. The transmission according to claim 4 in which means to selectively operate said transmission in a hydrostatic mode includes a further end shiftable gear secured to said first mentioned end shiftable gear on said hydrostatic motor drive shaft, and a hydrostatic drive gear secured to said first planetary cage, said means to end shift said first mentioned end shiftable gear also end shifting said further end shiftable gear concurrently, whereby said further end shiftable gear may be engaged with said hydrostatic drive gear, said outer ring gear, or a position in between, said hydrostatic motor controlling the speed and direction characteristics of said hydrostatic drive gear and hence said constant mesh gear box.

6. The transmission according to claim 2 in which said means to selectively operate said transmission in a hydromechanical mode includes a hydrostatic motor drive shaft journalled for rotation in said casing and being operatively connected to said hydrostatic motor, an end shiftable gear on said hydrostatic motor drive shaft, means to end shift said end shiftable gear whereby same is engaged with said outer ring gear in one position and is disengaged from said outer ring gear in another position, said hydrostatic motor, when said end shiftable gear is in said one position, controlling the speed and direction characteristics of said second planetary gear cage and hence the speed and directional characteristics of said connecting gear and said constant mesh gear box.

7. The transmission according to claim 6 in which means to selectively operate said transmission in a hydrostatic mode includes a further end shiftable gear secured to said first mentioned end shiftable gear on said hydrostatic motor drive shaft, and a hydrostatic drive gear secured to said first planetary cage, said means to end shift said first mentioned end shiftable gear also end shifting said further end shiftable gear concurrently, whereby said further end shiftable gear may be engaged with said hydrostatic drive gear, said outer ring gear, or a position inbetween, said hydrostatic motor controlling the speed and direction characteristics of said hydrostatic drive gear and hence said constant mesh gear box.

8. A multiple mode transmission for mobile units which include a source of power, a hydrostatic pump driven by said source of power and a hydrostatic motor selectively connectable to said hydrostatic pump; said transmission including a casing, a main drive shaft bearably supported for rotation within said casing and capable of selective connection to said source of power, a planetary gear assembly bearably supported on said main shaft, a constant mesh gear box mounted in combination with said casing, said constant mesh gear box having at least a high speed section position, a low speed section position and a neutral position, output shaft means in said constant mesh gear box and being operatively connected thereto, means to select any one of said high speed section position, said low speed section position or said neutral position, and means to selectively operate said transmission in any one mode of a plurality of modes which include a basic mechanical mode, by operatively connecting said planetary gear assembly to said constant mesh gear box, a hydrostatic mode by operatively connecting said hydrostatic motor to said constant mesh gear box, or a hydro-mechanical mode by operatively connecting said hydrostatic motor to said constant mesh gear box via said planetary gear assembly.

9. The transmission according to claim 8 in which said planetary gear assembly includes a sun gear secured for rotation to said main shaft, a first planetary cage, journalled for rotation upon said main shaft, a plurality of planetary gears supported for rotation within said first planetary cage and engaging said sun gear, a second planetary cage supported for rotation upon said first planetary cage, an inner and an outer ring gear assembly carried by said second planetary cage, said planetary gears engaging said inner ring gear, and a connecting gear secured to said first planetary cage, a constant mesh drive gear in said constant mesh gear box, said connecting gear being permanently engaged with said drive gear.

10. The transmission according to claim 9 in which said means to operate said transmission in said basic mechanical mode includes means to hold said ring gear and said second planetary cage stationary whereby rotation of said main shaft by said source of power rotates said sun gear, said planetary gears, said first planetary cage and said connecting gear.

11. The transmission according to claim 9 in which said means to selectively operate said transmission in a hydromechanical mode includes a hydrostatic motor drive shaft journalled for rotation in said casing and being operatively connected to said hydrostatic motor, an end shiftable gear on said hydrostatic motor drive shaft, means to end shift said end shiftable gear whereby same is engaged with said outer ring gear in one position and is disengaged from said outer ring gear in another position, said hydrostatic motor, when said end shiftable gear is in said one position, controlling the speed and direction characteristics of said second planetary gear cage and hence the speed and directional characteristics of said connecting gear and said constant mesh gear box.

12. The transmission according to claim 9 in which means to selectively operate said transmission in a hydrostatic mode includes a further end shiftable gear secured to said first mentioned end shiftable gear on said hydrostatic motor drive shaft, and a hydrostatic drive gear secured to said first planetary cage, said means to end shift said first mentioned end shiftable gear also end shifting said further end shiftable gear concurrently, whereby said further end shiftable gear may be engaged with said hydrostatic drive gear, said outer ring gear, or a position inbetween, said hydrostatic motor controlling the speed and direction characteristics of said hydrostatic drive gear and hence said constant mesh gear box.

* * * * *